June 17, 1958  H. A. G. SMITH  2,839,331
SLIDING DOOR FOR VEHICLES
Filed June 1, 1955  5 Sheets-Sheet 5
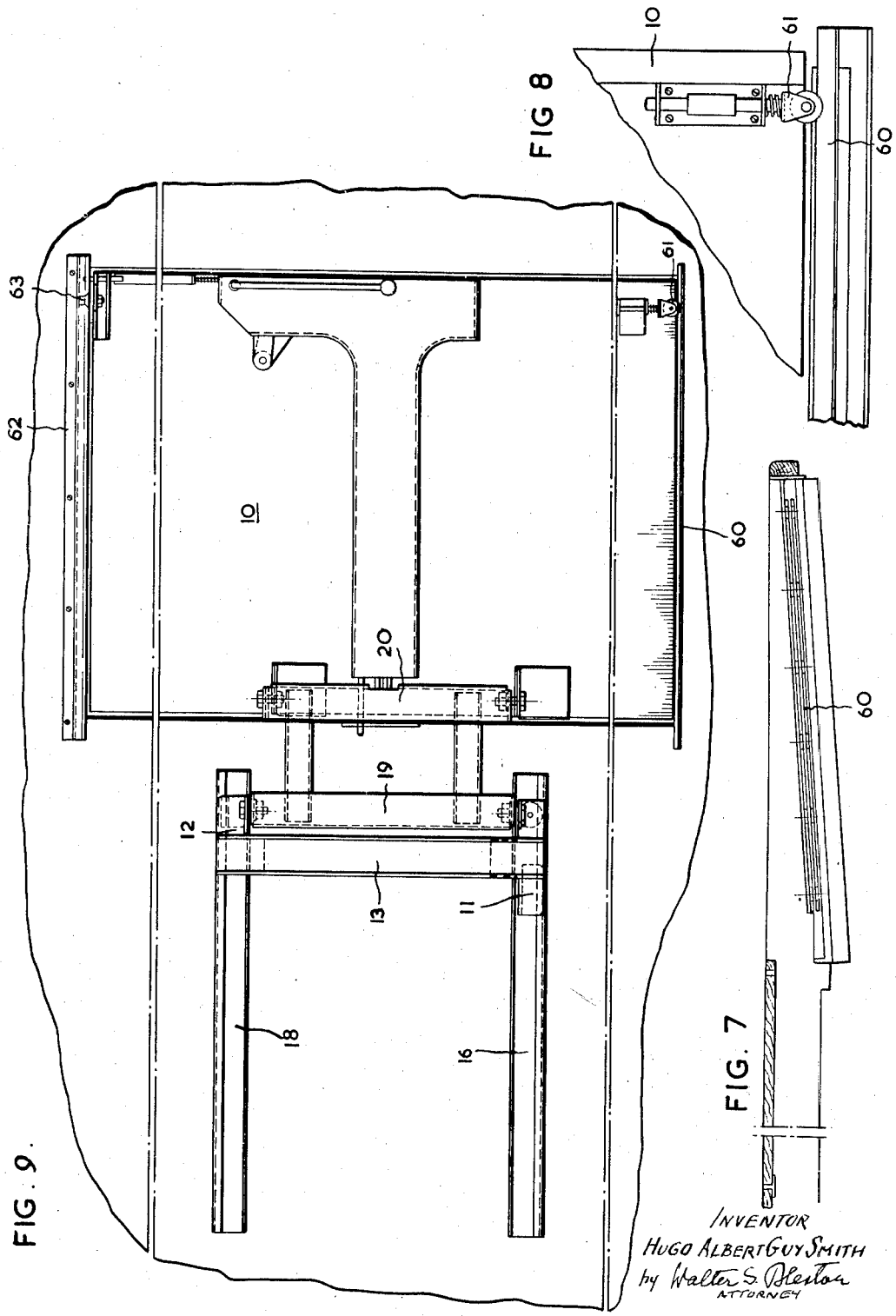

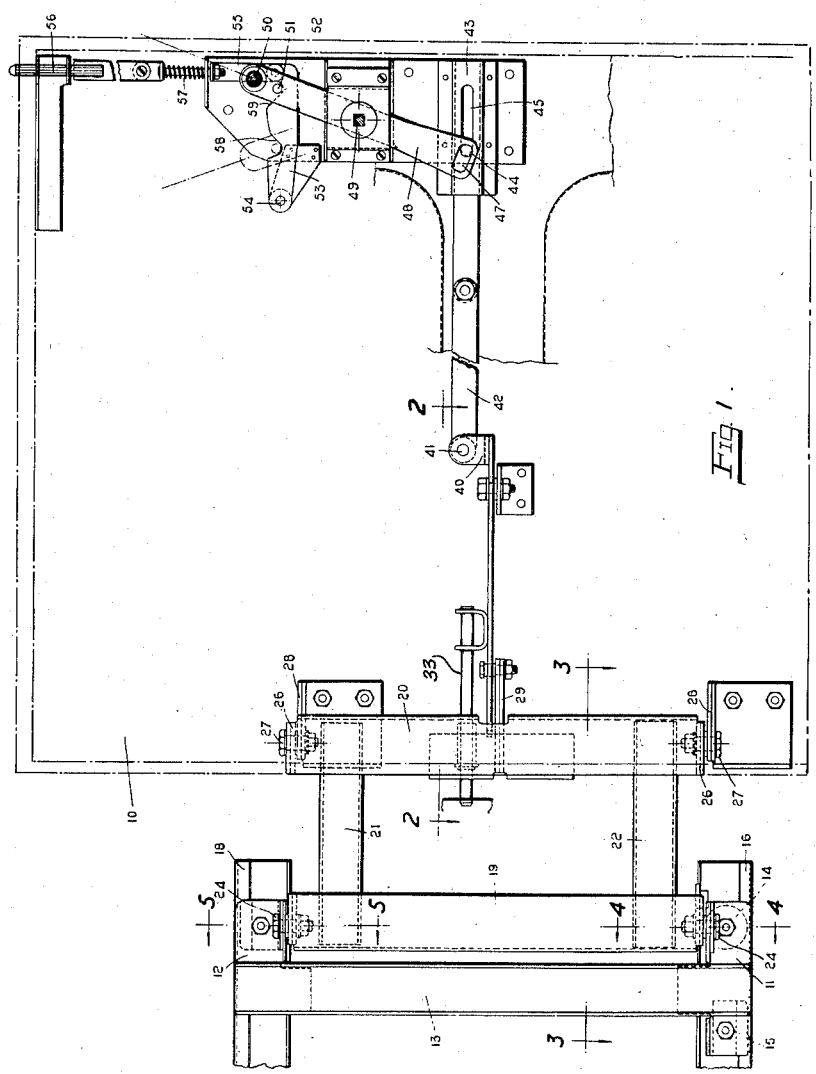

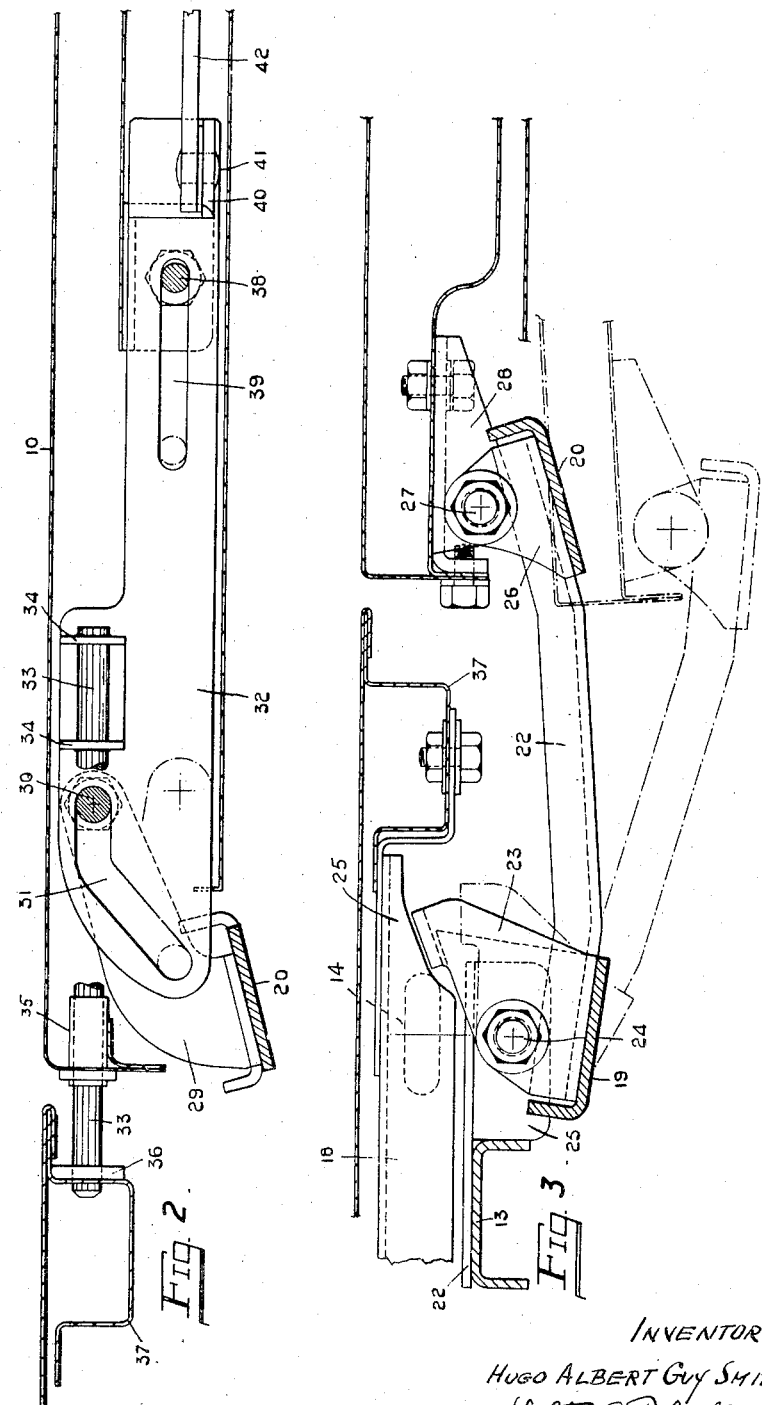

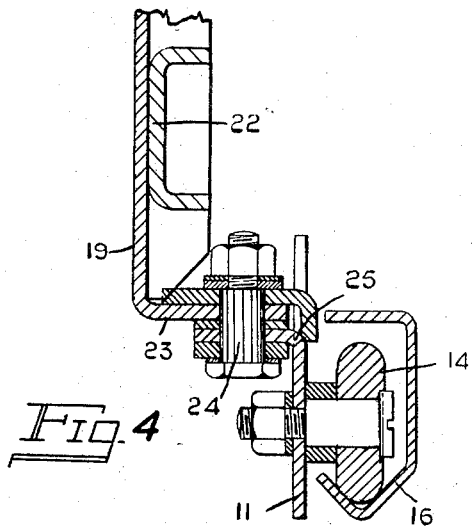
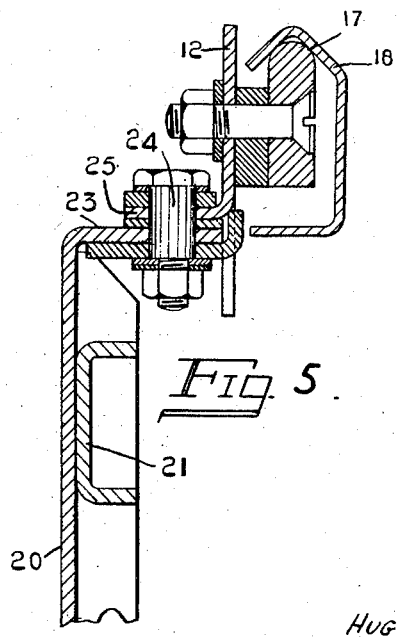

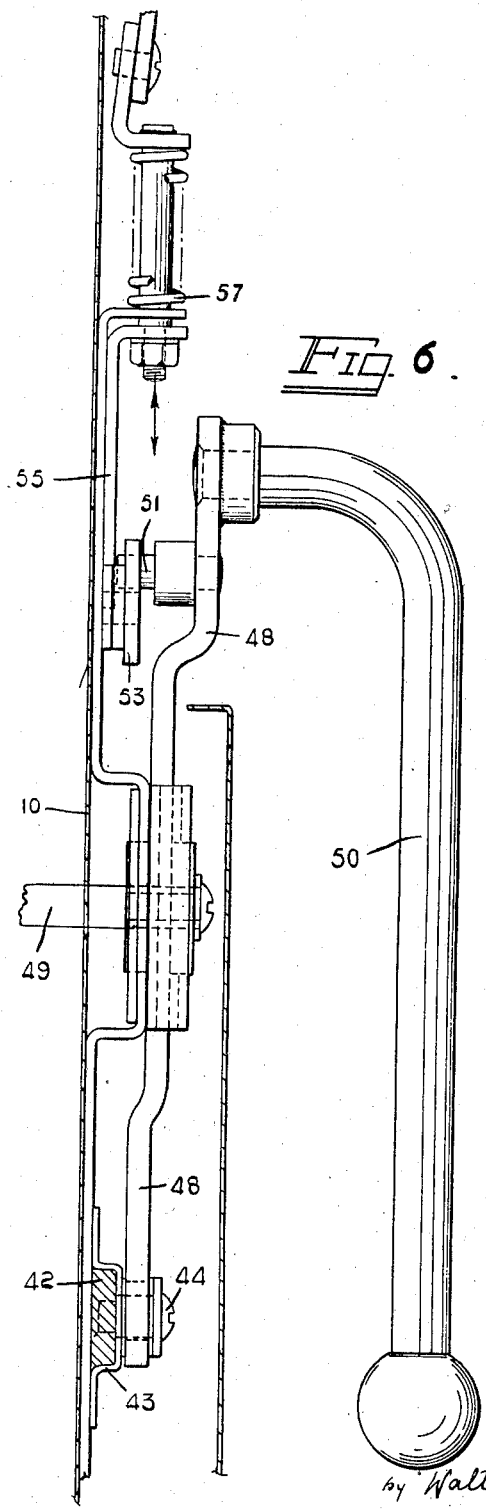

United States Patent Office 2,839,331
Patented June 17, 1958

2,839,331

SLIDING DOOR FOR VEHICLES

Hugo Albert Guy Smith, Sutton Coldfield, England, assignor to Weathershields Limited, Birmingham, England, a British company Application June 1, 1955, Serial No. 512,466

4 Claims. (Cl. 296—47)

This invention relates to a new or improved sliding door for vehicles.

My invention relates particularly to a flush fitting sliding door of the type in which the door when closed lies in the plane of the door opening and is adapted to pivot about one vertical edge which is guided for sliding on guides inclined at a small angle to the plane of the door opening and the other edge of the door is adapted to be moved laterally into and out of the plane of the door opening and is guided for sliding in guides or tracks substantially parallel to the opening, the arrangement being such that to open the door the second edge is moved laterally out of the plane of the door opening and then the door slides longitudinally into a position parallel to and in front of or behind the door opening.

One object of the present invention is to simplify the door guiding and operating mechanism in a sliding door of that type and to reduce its cost.

According to my invention in a sliding door of the type set forth above, the edge of the door remote from the pivotal edge is supported by a rigid link or strap of substantial depth pivotally connected to the door and to a carriage slidably guided on the vehicle body at the rear of the door opening, and a peg on the link adjacent to its connection to the door co-operates with a cam slot in a handle-operated plate which is slidably mounted on the door and carries a bolt adapted to engage in a socket or striking plate in the pillar or frame at the rear end of the door opening.

To open the door the sliding plate is retracted by the handle and this first withdraws the bolt and then the peg on the link is displaced laterally relative to the door by the cam slot to cause the rear edge of the door to be moved inwardly clear of the door opening, this movement being permitted by the pivotal connection of the link to the door and to the sliding carriage. Pressure applied to the handle in the opening direction will then cause the door to slide rearwardly clear of the opening, the front edge of the door sliding in the inclined guides and the rear edge moving parallel to the body side, the door in the open position lying parallel to the body side behind the door opening.

When the door is moved in the reverse direction it is brought into alignment with the opening and then movement of the handle in the appropriate direction effects movement of the sliding plate containing the cam slot which moves the rear edge of the door laterally into the plane of the door opening and projects the bolt into the pillar or fixed frame. The handle may conveniently be coupled to a spring-loaded toggle or other linkage which holds it resiliently in each of its operative positions. The handle may also operate a vertically movable bolt mounted on the door at or adjacent to its front edge and adapted to enter a socket in the cantrail to lock the door in the closed position.

One practical embodiment of my invention is illustrated by way of example in the accompanying drawings in which:

Figure 1 is a front elevation on a reduced scale of the complete actuating mechanism seen from the inner side of the door.

Figure 2 is a fragmentary sectional plan on the line 2—2 of Figure 1.

Figure 3 is a horizontal section of the swinging link on the line 3—3 of Figure 1.

Figure 4 is a fragmentary vertical section on the line 4—4 of Figure 1.

Figure 5 is a fragmentary vertical section on the line 5—5 of Figure 1.

Figure 6 is an elevation of the handle mechanism looking in the direction of the arrows 7 in Figure 1.

Figure 7 is a top plan view of the track guiding the lower front corner of the door.

Figure 8 is an elevation of the lower front corner of the door, and

Figure 9 is an elevation of a portion of the vehicle and door assembly.

In the construction illustrated the rear edge of the sliding door 10 is supported on the body side by a sliding carriage comprising a lower horizontal member 11 of substantial length, an upper horizontal member 12, and a vertical channel-section member 13 welded or otherwise rigidly connected to the horizontal members. The vertical depth of the carriage is conveniently about one quarter of the depth of the door. The lower horizontal member 11 carries at its front end a roller 14 and at its rear end a hardened shoe 15, the roller and shoe being adapted to slide in a horizontal V guide 16 fixed to the body side. The upper member 12 carries a hardened shoe 17 adapted to slide in a parallel inverted V guide 18. The shoe 17 on the upper member is in vertical alignment with the roller 14 on the lower member. The rear edge of the door is pivotally coupled to the carriage by a rectangular skeleton strap or link comprising two spaced vertical members 19, 20 of angle section connected by two spaced horizontal members 21, 22 of channel section, the latter being cranked as shown in Figure 3.

At the top and bottom of the rear vertical member 19 of the link one flange of the member is extended and cranked over towards the body side to form lugs 23 which are pivotally connected by studs 24 to complementary lugs 25 on the upper and lower horizontal members 11 and 12 of the carriage, the axes of the studs being in a vertical plane at right angles to the body side and containing the axis of the roller 14.

Other lugs 26 are provided at the top and bottom of the front vertical member 20 of the link and are pivotally connected by studs 27 to lugs 28 fixed to the inner face of the door at its rear edge.

At an intermediate point in the depth of the link the front vertical member 20 also carries a lug 29 which extends forwardly into a gap cut in the inner panel of the door, and a peg 30 is fixed on the free end of this lug. The peg works in a cam slot 31 in a horizontal plate 32 slidably mounted in the door, the cam slot being of the form shown in Figure 2. A bolt 33 is fixed in lugs 34 on the plate and is slidably guided in a bushing 35 in the rear edge of the door, and this bolt is adapted to enter a socket or striking plate 36 in the body pillar 37 at the rear end of the door opening.

The plate 32 is guided by means of a stud 38 fixed in the door and extending through a longitudinal slot 39 in the plate. At its forward end the plate has an upturned lug 40 to which is pivotally connected by a rivet 41 the rear end of a link 42 of which the front end is slidably mounted in a housing 43 fixed to the door adjacent to its front edge. A peg 44 mounted in the link is guided in a slot 45 in the housing and is received in a short arcuate slot 47 in the lower end of an operating lever 48 mounted for angular movement about a pivot 49 on the door. The lever is extended above its pivot and an operating handle 50 is fixed to its upper end.

A peg 51 fixed in the lever 48 near its upper end normally lies in a notch 52 in the upper edge of a latch member 53 of which one end is pivoted at 54 on the door. The end of the latch member remote from the pivot 54 and adjacent to the notch 52 is coupled by a strip 55 to a bolt 56 which is guided for vertical movement on the door and is loaded by a spring 57 which urges the bolt and the latch member upwardly to hold the peg 51 in the notch 52 and so to hold the lever 48 and the rest of the mechanism in the locked position shown in Figure 1. A second notch 58 in the latch member receives the peg 51 when the mechanism is in its unlocked position and holds the lever 48 in that position.

As clearly shown in Figs. 7, 8 and 9, the front edge of the door is supported and guided at the bottom and top respectively, by a roller 61 running on a bottom guide 60 and a roller 63 engaging in a top guide 62. These rollers allow the door to pivot about its forward edge.

When the door is closed the various parts of the mechanism are in the positions shown in the drawings, the door lying within the door opening in the plane of the body side. The front edge of the door is locked by the bolt 56 which engages in a socket or striking plate in the cantrail, and the rear edge is locked by the bolt 33.

When the lever 48 is turned by means of the handle in an anticlockwise direction as viewed in Figure 1 the first part of the movement does not affect the link 42 owing to the lost motion provided by the slot 47, but the peg 51 on the lever engaging the inclined edge 59 of the notch 52 depresses the latch member 53 and withdraws the bolt 56. Then as the angular movement of the lever continues it picks up the peg 44 and through the link 42 draws the plate 32 forwardly, that is, to the right in Figure 1. The movement of the plate first withdraws the bolt 33 from its engagement with the rear door pillar while the peg 30 is in the front part of the cam slot 31 which is parallel to the plane of the door. Then as the movement of the plate continues the peg enters the inclined part of the cam slot and the rear edge of the door is caused to swing inwardly out of the plane of the door opening, the door swinging on the strap or link which moves from the position shown in full lines in Figure 3 to the position shown in dotted lines.

As soon as the rear edge of the door is clear of the door opening the door is free to slide rearwardly and is moved into the open position by continued pressure applied to the handle, the rear edge of the door being supported by the sliding carriage which slides rearwardly in the guides 16 and 18 while the front edge is guided by the aforementioned pivoted rollers 61 and 63 running in or on the guides 60 and 62 respectively, which may be inclined at a small angle to the plane of the door as shown in Fig. 7 with respect to the guide 60.

As the opening movement of the operating mechanism is completed the peg 51 on the lever 48 passes into the notch 58 in the latch member which holds the handle and the rest of the mechanism in that position.

To close the door it is first moved forwardly by means of the handle into alignment with the door opening. The lever 48 is then moved angularly in a clockwise direction and the various other movements described above take place in the reverse order, the rearward movement of the plate 32 first drawing the rear edge of the door into the plane of the door opening and then projecting the bolt 33 into its socket in the rear door pillar. In the last part of the movement of the lever the peg 51 passes into the notch 52 in the latch member 53, and the bolt 56 is projected by its spring to lock the front edge of the door.

In the above description and in the appended claims the door is referred to as sliding rearwardly into the open position but it will be appreciated that the terms front and rear are used for convenience and that in some applications the door may slide forwardly into the open position. In such cases the door will pivot about its rear edge and the guides for the sliding carriage will be mounted on the vehicle body in front of the door opening.

I claim:

1. In a motor vehicle, a flush fitting sliding door assembly comprising a horizontally slidable door adapted, when closed, to fit into an opening in a wall of said vehicle, tracks on said vehicle for guiding the upper and lower ends of one vertical edge of said door, said tracks being inclined at a small angle to the plane of said opening, a carriage guided for horizontal movement on said wall parallel to the plane of the opening and adjacent one edge of the opening, a strap of substantial depth pivoted to said carriage about a vertical axis, and to the second vertical edge of the door, about a second vertical axis, a lug on said strap projecting beyond said second vertical edge and carrying a peg, a plate guided for horizontal reciprocating movement on said door parallel to its plane and having a cam slot in which said peg engages, and means for causing movement of said plate relative to said door whereby the engagement of said peg and slot causes transverse horizontal movement of said second vertical edge of the door into and out of the plane of the opening.

2. A flush fitting sliding door assembly as claimed in claim 1, including a bolt rigidly attached to said plate and a latch mounted on the one edge of said door, and a linkage between said plate and said latch and including a lost motion connection whereby, said bolt moves into and out of connection with said latch during a part of the reciprocating movement of said plate.

3. A flush fitting sliding door assembly as claimed in claim 1, wherein said means for causing movement of said plate comprise a handle adjacent the first edge of the door, pivoting about an axis perpendicular to the plane of the door and joined to said plate by a substantially horizontally extending link.

4. A flush fitting sliding door assembly as claimed in claim 3, wherein said handle also operates means for locking the first edge of said door in the opening.

References Cited in the file of this patent

UNITED STATES PATENTS

| 2,570,563 | Kreimendahl | Oct. 9, 1951 |

FOREIGN PATENTS

| 717,071 | France | Dec. 31, 1931 |
| 645,513 | Great Britain | Nov. 1, 1950 |
| 709,914 | Great Britain | June 2, 1954 |